United States Patent [19]

Krukowski

[11] Patent Number: 4,525,913
[45] Date of Patent: Jul. 2, 1985

[54] CHAIN REPLACEMENT APPARATUS

[76] Inventor: Blair S. Krukowski, 20009 SE. Stark, Portland, Oreg. 97233

[21] Appl. No.: 368,761

[22] Filed: Apr. 15, 1982

[51] Int. Cl.³ ............................................. B25B 27/00
[52] U.S. Cl. ...................................... 29/270; 81/486; 474/130
[58] Field of Search .................... 29/270, 271; 81/3 R; 474/130; 269/130, 131

[56] References Cited

U.S. PATENT DOCUMENTS

| 1,770,763 | 7/1930 | Wolfstyn | 269/25 |
| 4,373,240 | 2/1983 | Castoe | 29/281.6 |

FOREIGN PATENT DOCUMENTS 620717  8/1978  U.S.S.R. .............................. 474/130

Primary Examiner—Frederick R. Schmidt
Assistant Examiner—Steven P. Schad
Attorney, Agent, or Firm—Kolisch, Hartwell and Dickinson

[57] ABSTRACT

Apparatus for use in replacing a mounted endless chain which connects a pair of sprockets, where one of the sprockets has an exposed portion facing away from the other sprocket. The apparatus includes a holder and a pair of spaced, confronting chain-abutments carried on the frame plate, adapted to contact a pair of spaced regions of the chain, where such is trained over the exposed sprocket portion. An opening formed between the two members is adapted to receive the two disconnected end portions of a replacement chain. Chain support means are provided to support a replacement chain.

8 Claims, 5 Drawing Figures

CHAIN REPLACEMENT APPARATUS

BACKGROUND AND SUMMARY OF THE INVENTION

The present invention relates to a tool for use in replacing a chain connecting a pair of sprockets in a drive system.

In many chain drive systems having a pair of sprockets drivingly connected by an endless chain, only one of the two sprockets is readily accessible. In such a system, it is advantageous to be able to replace the chain without having to access the more difficult-to-reach sprocket. The foregoing considerations apply particularly to the replacement of a timing chain in an overhead cam automotive engine, where access to the driveshaft sprocket in the engine may require removal of the radiator, water pump, oil pump, smog control equipment, etc., and may even require complete engine removal.

In replacing a timing chain in an overhead cam engine, it is essential to maintain the rotational relationship between the driveshaft sprocket and the camshaft sprocket. This can be done by opening the timing chain at a point near the top of the camshaft sprocket, through disconnecting the typical disconnect joint therein, and by connecting the disconnected chain ends to the two disconnected ends of a replacement chain, to form a double-length endless chain. The engine is then turned over slowly, while maintaining the double-length chain in engagement with the camshaft sprocket, until the positions of the two chains have substantially been transposed. The old chain is then disconnected from the replacement chain, and the free ends of the replacement chain are connected to complete the operation.

Heretofore, the above-described transposition of the old and new timing chains has been somewhat difficult, requiring the operator to keep the combined, double-length chain engaged at all times with the camshaft sprocket, and at the same time, to keep the loose portion of the double-length chain from becoming tangled or caught on an engine part. If chain tangling occurs, the moving chain may be pulled off the camshaft sprocket, causing rotational misalignment between the two sprockets. Also, a chain-tensioning member in the engine may be released toward a locked, fully extended position, or the member may become partially disassembled. The amount of work required to replace the timing chain is then greatly increased, requiring the extensive engine disassembly noted above.

One object of the present invention is to provide apparatus for replacing a chain connecting a pair of sprockets, where one sprocket only is readily accessible.

Another object of the invention is to provide such apparatus constructed to overcome above-mentioned problems associated with replacement of a timing chain in an overhead cam automotive engine.

Another object of the present invention is to provide such a device which is simple and relatively inexpensive in construction.

The apparatus of the present invention includes a holder and a pair of spaced, chain abutments carried on the holder for contacting spaced regions in a connecting chain, where such is trained over an exposed portion of a sprocket. The members function to maintain engagement between such spaced chain regions and the sprocket during a chain replacement operation. An opening formed between the abutments is adapted to receive the two disconnected end portions of a replacement chain, which end portions are connected to the disconnected ends of the old chain during chain replacement. The apparatus is open on one side between the abutments to expose connecting links of a chain to be replaced to permit manipulation of the chain ends during replacement.

Chain support means are provided to support a replacement chain. One embodiment of the invention includes a position-adjustable chain-support wheel for supporting a double-length chain, formed by joining the disconnected ends of an old chain and a replacement chain, under tension during a chain replacement operation. In other embodiments of the invention, a pair of arcuate chain-supports are provided, for guiding and supporting sections of a replacement chain over opposite sides of the apparatus.

These and other objects and features of the present invention will become more fully apparent when the following detailed description of preferred embodiments of the invention is read in connection with the accompanying drawings.

DETAILED DESCRIPTION OF PREFERRED EMBODIMENT OF THE INVENTION

Figure 1:
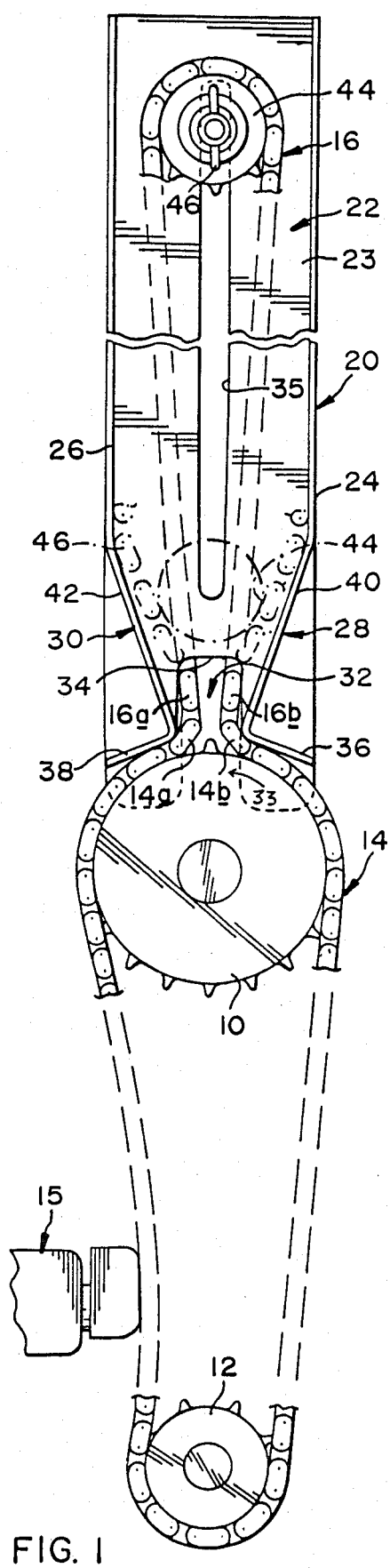
FIG. 1 is a front view of a preferred embodiment of the present invention, shown operatively in conjunction with the timing chain system in an automotive engine.

FIG. 1 shows a camshaft sprocket 10 and a driveshaft sprocket 12 in a timing chain system in a typical overhead cam automotive engine. Sprocket 12 is drivingly connected to sprocket 10 by a mounted timing chain 14 in the system. Chain 14 is maintained under tension by a conventional, hydraulic chain tensioner 15 shich acts against the side of chain 14 adjacent sprocket 12, as shown. Tensioner 15 has a conventional construction, including a coil-spring mechanism for maintaining tension in chain 14 when the engine is not operating. The upper portion, and more particularly the upper half, of sprocket 10 is accessible by removal of a sprocket cover (not shown) in a typical overhead cam automotive engine. By contrast, access to sprocket 12 and to tensioner 15 in a typical engine may require removal of the engine's radiator, water pump, alternator, distributor, smog control equipment, etc., and in some cases, may require complete removal of the engine from the engine housing.

Chain 14 in FIG. 1 is a conventional link-type chain whose adjacent links can be disconnected by removal of a link pin, in a conventional manner. Chain 14 in FIG. 1 is shown with disconnected links 14a, 14b joined to the disconnected links 16a, 16b, of a second, substantially identical replacement timing chain 16. The two chains are connected to form the double-length chain seen in FIG. 1 during a chain replacement operation, as will be described below.

Also seen in FIG. 1 is a timing chain replacement apparatus 20 constructed according to a preferred embodiment of the invention. Apparatus 20 includes an elongate holder or frame plate 22 having a back plate 23 which is bordered, along a substantial upper portion, by a pair of side plates 24, 26. The lower ends of side plates 24, 26 are fashioned to form a pair of spaced, substantially V-shaped members 28, 30, respectively. The inwardly facing vertices in the two members define a throat, or opening, 32 dimensioned to receive therethrough the two end portions of a replacement chain, such as those of chain 16 seen in FIG. 1. An elongate rectangular slot 34 formed in the lower portion of plate 23 is aligned with, and has substantially the same width as, opening 32, as seen. An elongate slot 35 formed in plate 23 is substantially coextensive with the parallel portions of side plates 24, 26.

Members 28, 30 have opposed chain-abutment portions 36, 38, which diverge from one another on progressing downwardly from opening 32 in FIG. 1, forming a pocket 33. The pocket is open between the abutments opposite from plate 23 to expose a portion of chain 14 disposed on sprocket 10. These two abutments are arranged and dimensioned to contact spaced regions of a timing chain, such as chain 14, where the same is trained over the camshaft sprocket, with the apparatus operatively placed against the sprocket, as shown in FIG. 1. The abutments are mounted on one side of the frame plate adjacent one end of the frame plate. The abutments occupy a common plane and are spaced from each other in the plane, facing outwardly from one end of the frame plate. The opposed portions of members 28, 30 which diverge on progressing upwardly, on the other side of opening 32 are referred to herein as chain-guides 40, 42, respectively. The above-described unit in apparatus 20 is preferably constructed integrally from sheet metal, molded plastic, or the like.

Apparatus 20 further includes chain-support means including a sprocket 44 rotatably carried on a suitable mounting structure. The sprocket is selectively moveable along slot 35, for placement at a desired position with respect to opening 32, by tightening a wing nut 46 in the mounting structure. The sprocket is shown in raised and lowered positions in solid and dash-dot lines, respectively, in FIG. 1.

Describing use of apparatus 20 in a timing chain replacement operation, removal of the camshaft sprocket cover in an automotive engine exposes the upper portion of sprocket 10 in FIG. 1. The mechanic performing the operation wedges wood blocks, rags or the like, between the sides of the sprocket and the adjacent walls of the chain housing (not shown) to hold the timing chain in place on the sprocket. Two links in chain 14 located near the top of the sprocket, such as links 14a, 14b in FIG. 1, are disconnected, and are joined to the disconnected end links of the replacement chain to form a double length chain.

With the rags or blocks still in place, apparatus 20 is now placed against sprocket 10, with sprocket 10 and mounted chain 14 trained thereover received in the pocket formed by the abutments and the frame plate, in the manner shown. The length of apparatus 20 is such that, for most sizes of automobile timing chans, the upper portion of the double-length chain can be engaged on sprocket 44, and the chain pulled taut by shifting the sprocket upwardly in slot 35, as shown in FIG. 1. With the sprocket locked in such abutments, portions 36, 38 are held firmly against spaced upper portions of sprocket 10 and chain 14 thereby capturing the chain in registry on the sprocket. In a few automobile models, and in other chain replacement applications, the double-length timing chain formed by the above procedure may be too long to be held in a stretched condition on sprocket 44 in the apparatus. Where the apparatus is used in replacing such relatively long timing chains, sprocket 44 is shifted to its lowered position, shown by the dashed-dot circle in FIG. 1, to drivingly engage opposite end regions of the replacement chain at positions where these end regions are held in place between the sprocket and upwardly diverging portion 40, 42, as shown in dashed-dot lines for fragmentary portions of a chain 46 in FIG. 1.

After engaging sprocket 44 with the replacement chain in the double-length chain, in a manner described above, the blocks or rags originally placed between the sides of sprocket 10 and the adjacent walls of the chain housing are removed, and the engine is turned over slowly to transpose the positions of the existing and replacement timing chains. It can be appreciated that for both relatively short timing chains, where sprocket 44 operates in its raised position in FIG. 1, and relatively long timing chains, where the sprocket operates in its lowered position in the figure, sprocket 44 functions to maintain registry between upwardly and downwardly moving portions of the double-length chain during chain transposition.

After chain transposition, the rags or blocks are replaced to hold the replacement chain, such as chain 16, in position, and under tension, between sprockets 10, 12. Apparatus 20 is then removed, the old chain is disconnected, and the free ends of the replacement chain are connected to complete the operation. The usual timing chain replacement kit includes a master link used in connecting the free ends of the replacement chain together.

Figure 3:
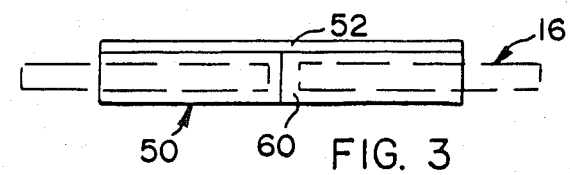
FIG. 3 is a top view taken generally along line 3—3 in FIG. 2.
Figure 2:
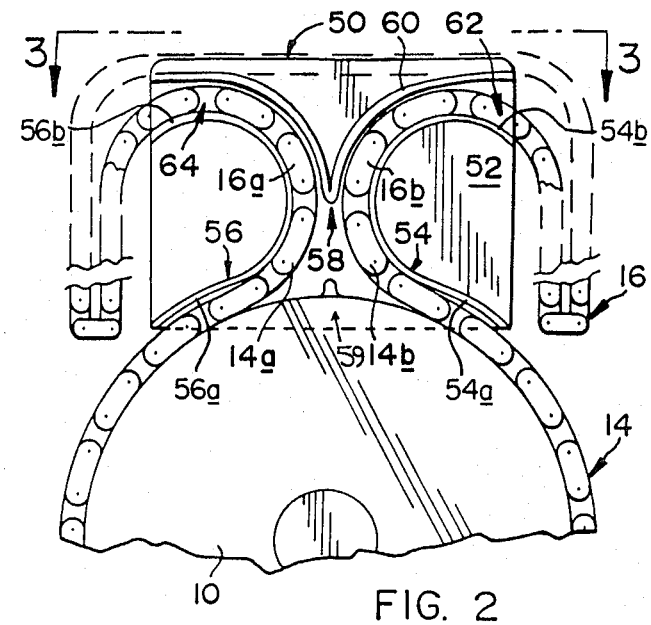
FIG. 2 is an enlarged front view of a second embodiment of the present invention, shown operatively in conjunction with an upper fragmentary portion of a camshaft sprocket in the system seen in FIG. 1.

A timing chain replacement apparatus constructed according to a second embodiment of the invention is shown generally at 50 in FIGS. 2 and 3. The apparatus is shown here in conjunction with previously-described sprocket 10 and chains 14, 16. The apparatus includes a holder or frame plate 52 having mounted on one side thereon, in a common plane, opposed, generally ear-shaped members 54, 56 which define a throat, or opening, 58 in the region of closest approach of the two members. Lower chain-abutment portions 54a, 56a of the two members are shaped to conform to the curvature of a timing chain on sprocket 10, as shown. As was the case with reference to pocket 33 in FIG. 1, pocket 59 is open opposite from holder 52. A pocket 59 is formed by abutments 54a, 56a and frame plate 52. Also attached to holder 52 is a generally V-shaped member 60 which forms, with upper chain-support portions 54b, 56b of members 54, 56, respectively, a pair of chain-guide slots 62, 64, respectively, which act to support a replacement chain at opposed sides of the apparatus in a region above and to either side of opening 58. The apparatus and associated parts of a replacement chain, such as chain 16, are seen in top view in FIG. 3.

The use of apparatus 50 in replacing a timing chain is similar to that described above with reference to apparatus 20. In particular, after the old chain and the replacement chain are joined together to form a double-length chain, the apparatus is placed in the position shown in FIG. 2, with chain 16 arranged on the apparatus as shown. With the apparatus held manually in place, the engine is turned over slowly to transpose the positions of chains 14, 16. It can be appreciated that during chain transposition, loosely hanging portions of the chain are supported on either side of the apparatus in relatively short segments which have a minimum tendency to kink or knot.

Figure 5:
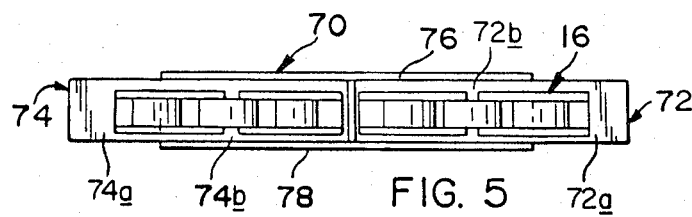
FIG. 5 is a top view taken generally aong line 5—5 in FIG. 4.
Figure 4:
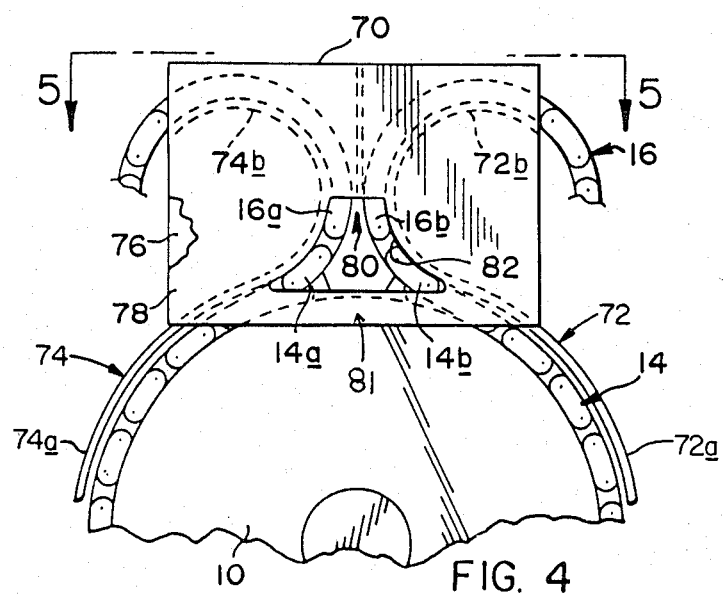
FIG. 4 is a view similar to FIG. 2, but showing in front view a third embodiment of the invention.

An apparatus 70 constructed according to a third embodiment of the invention is shown in front and top views in FIGS. 4 and 5, respectively. Two opposed, generally ladle-shaped members 72, 74 in the apparatus are sandwiched between, and joined to, a holder or frame plate 76 and a cover plate 78. The lower chain-abutment portions 72a, 74a of members 72, 74, respectively, below an opening 80 formed between the two members, are fashioned to form an arcuate pocket 81 with holder 76; to embrace opposed chain regions on the upper portion of a sprocket, such as sprocket 10, as shown. The arcuate chain-support portions 72b, 74b of the members above opening 80 are fashioned to guide and support the end regions of a replacement chain, such as chain 16, to the sides of the apparatus. A substantially trapezoidal opening 82 formed in cover plate 78 exposes links 14a, 14b in the position shown and provides working access to the chains in a chain replacement operation. The use and functioning of the apparatus in replacing a timing chain is like that described above with reference to apparatus 50.

The present invention, embodied in the three apparatuses described herein, provides a simple tool for use in replacing a chain in a sprocket-and-chain drive system, where only one of the sprockets is easily accessible. In apparatus 20, a double length chain formed by the old chain and the replacement chain is maintained in registry, during chain transposition, on the sprockets by a sprocket in the apparatus, where such is moved to a raised position for shorter-length chains and to a lowered position for longer-length chains. At the same time, the double-length chain is held in engagement with the cam sprocket by the chain-abutments. In the other embodiments of the invention, chain-support portions act to hold unsupported portions of the double-length chain on opposite sides of the apparatus to minimize kinking and knotting in the double-length chain during chain transposition.

While preferred embodiments of the present invention have been described herein, it is apparent that various changes and modifications can be made without departing from the spirit of the invention.

It is claimed and desired to secure by Letters Patent:

1. Apparatus for replacing a mounted endless chain having a pair of adjacent connected and disconnectible links where a portion of the mounted chain is trained over a sprocket, with the pair of disconnectible links being positionable on the sprocket, said apparatus comprising a frame plate, a pair of chain-abutments mounted on one side of the frame plate adjacent one end of the frame plate, said abutments occupying a common plane and being spaced from each other in said plane and facing outwardly from said one end of the frame plate, said abutments and said one end of the frame plate forming a pocket adapted to receive a portion of the sprocket and the mounted chain trained thereon, with a pair of disconnectible links being positionable in said pocket with the connection between the pair of disconnectible links being unobstructed radially outwardly from the sprocket by said abutments, said pocket further being open laterally of the plane of said abutments sufficiently to expose, when a portion of a sprocket and a mounted chain trained thereon is received in the pocket, at least a pair of links in the chain disposed between the abutments, said abutments defining an opening between them adapted with disconnection of the mounted chain when such extends between the abutments to receive the disconnected chain ends produced by the disconnection of the mounted chain, and chain support means mounted on said frame plate spaced towards an end of the frame plate opposite said one end for supporting a replacement chain while such replacement chain is being connected to the disconnected chain ends of the mounted chain.

2. The apparatus of claim 1, wherein said frame plate includes an elongate slot extending intermediate said opening and said frame plate's other end, and said chain support means includes a shiftable sprocket which is adjustable along said slot.

3. The apparatus of claim 1, wherein said chain support means comprises a pair of arcuate chain-supports located on either side of said opening for supporting reaches of chain draped thereover.

4. The apparatus of claim 1, which further includes a pair of chain guides mounted on said frame plate occupying the plane of said abutments and spaced towards the other end of said frame plate from said abutments.

5. In combination with a sprocket and a mounted chain having a pair of adjacent connected and disconnectible links and disposed with a portion of said chain containing said pair of disconnectible links trained over said sprocket, an apparatus for replacing said mounted chain with a replacement chain comprising a frame plate, a pair of spaced chain abutments mounted on said frame plate pressing the chain-mounting sprocket at regions spaced along the perimeter of the sprocket thereby capturing the chain in registry on the sprocket, said chain abutments defining an opening therebetween which accommodates the insertion therein of disconnected chain ends produced by breaking the mounted chain where the chain extends over said sprocket between said spaced abutments, said opening between said chain abutments adjacent said sprocket further being open laterally of said sprocket sufficiently to expose at least a pair of links in said chain, and chain support means mounted on said frame plate disposed in a direction extending radially of the sprocket outwardly of said abutments and said opening for holding an expanse of replacement chain having chain ends for attaching to the disconnected chain ends produced by breaking the mounted chain.

6. The apparatus of claim 5, wherein said frame plate includes an elongate slot extending intermediate said opening and said frame plate's other end, and said chain support means includes a shiftable sprocket which is adjustable along said slot.

7. The apparatus of claim 5, wherein said abutments occupy a plane, and which includes a pair of chain supports mounted on said frame plate occupying the plane of said abutments and spaced towards the other end of said frame plate from said abutments.

8. Apparatus for replacing a mounted chain having a pair of adjacent connected and disconnectible links where a portion of the mounted chain is trained over a sprocket and fits against the sprocket with the pair of disconnectible links being positionable on the sprocket, comprising a frame plate, a pair of spaced chain abutments mounted on one side of said frame plate adjacent one end of the frame plate occupying a common plane and spaced from each other in said plane, said abutments facing outward from said end of the frame plate, said abutments being spaced from each other in said plane and defining between them an opening, said abutments being adapted to press the mounted chain against the sprocket where the chain is trained over the sprocket at portions spaced arcuately on the sprocket with the joint between the pair of disconnectible links, when disposed between said abutments, being unobstructed radially outwardly from the sprocket by said abutments, and said opening accommodating the passage therethrough of disconnected chain ends produced on breaking of the mounted chain where such extends between the abutments, said frame plate having an elongate slot extending intermediate said opening and the other end of the frame plate, chain support means for supporting a replacement chain while such replacement chain is being connected to the disconnected chain ends of the mounted chain, said support means comprising a sprocket adjustable mounted in said slot, said frame plate projecting beyond said abutments at said one end to form with said abutments a pocket for seating the apparatus on a sprocket, said pocket being open laterally of the plane of said abutments sufficiently to expose, when a portion of a sprocket and a mounted chain trained thereon is received in the pocket, at least a pair of links in the chain disposed between the abutments.

* * * * *